(12) United States Patent
Morimoto et al.

(10) Patent No.: US 6,708,487 B2
(45) Date of Patent: Mar. 23, 2004

(54) EXHAUST EMISSION CONTROL DEVICE

(75) Inventors: Manabu Morimoto, Kyoto (JP); Kazuya Oohashi, Siga (JP); Mikio Terada, Siga (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/315,989

(22) Filed: Dec. 11, 2002

(65) Prior Publication Data

US 2003/0106309 A1 Jun. 12, 2003

(30) Foreign Application Priority Data

Dec. 12, 2001 (JP) ...................... P2001-378946

(51) Int. Cl.$^7$ ................................ F01N 3/02
(52) U.S. Cl. .............. 60/311; 60/295; 60/297; 60/285
(58) Field of Search .............. 60/285, 295, 297, 60/300, 311

(56) References Cited

U.S. PATENT DOCUMENTS

| | | | | |
|---|---|---|---|---|
| 4,535,588 A | * | 8/1985 | Sato et al. | 60/286 |
| 4,709,547 A | * | 12/1987 | Pischinger et al. | 60/274 |
| 4,835,964 A | * | 6/1989 | Kume et al. | 60/285 |
| 4,902,487 A | * | 2/1990 | Cooper et al. | 423/215.5 |
| 5,711,149 A | * | 1/1998 | Araki | 60/278 |
| 5,746,989 A | * | 5/1998 | Murachi et al. | 423/213.7 |
| 5,974,791 A | * | 11/1999 | Hirota et al. | 60/276 |
| 6,293,096 B1 | * | 9/2001 | Khair et al. | 60/286 |
| 6,294,141 B1 | * | 9/2001 | Twigg et al. | 423/213.7 |
| 6,304,815 B1 | * | 10/2001 | Moraal et al. | 701/115 |
| 6,405,528 B1 | * | 6/2002 | Christen et al. | 60/295 |
| 6,427,436 B1 | * | 8/2002 | Allansson et al. | 60/274 |
| 6,546,721 B2 | * | 4/2003 | Hirota et al. | 60/297 |

FOREIGN PATENT DOCUMENTS

| | | |
|---|---|---|
| EP | 0 859 132 A1 | 8/1998 |
| EP | 199 52 830 A | 5/2001 |
| EP | 1 108 862 A2 | 6/2001 |
| JP | 2000-170526 | * 6/2000 |
| JP | 2001-115822 | * 4/2001 |
| WO | WO 99 44725 A | 9/1999 |

OTHER PUBLICATIONS

Patent Abstracts of Japan—vol. 2000, No. 03, Mar. 30, 2000 & JP 11 336530 A 7 Dec. 1999.

* cited by examiner

Primary Examiner—Thomas Denion
Assistant Examiner—Diem Tran (57) ABSTRACT

A control unit activates regeneration assist means, if a specific operating state involving incomplete combustion of particulates by $NO_2$ continues for a predetermined period or more, as a first determination condition, and controls an exhaust gas temperature or a temperature of a catalyst to enhance the conversion efficiency of the catalyst into $NO_2$, thereby continuously regenerating the particulates. The control unit activates forced regeneration means, if a deposited amount of particulates detected by deposited amount detecting means exceeds a predetermined value, as a second determination condition, and controls the exhaust gas temperature or a temperature of a filter to be higher than that of when the regeneration assist means is activated to forcibly regenerate the filter. The control unit activates either the forced regeneration means or the regeneration assist means in accordance with the temperature sensed by temperature sensing means, if the first and second determination conditions are simultaneously established.

7 Claims, 6 Drawing Sheets

EXHAUST EMISSION CONTROL DEVICE

This nonprovisional application claims priority under 35 U.S.C. §119(a) on Patent Application No. 2001-378946 filed in JAPAN on Dec. 12, 2001, which is herein incorporated by reference.

BACKGROUND OF THE INVENTION

1. Field of the Invention

The present invention relates to an exhaust emission control device suitable for a diesel engine.

2. Description of the Related Art

An exhaust gas exhausted from a diesel engine contains particulates (soot) mainly composed of carbon, and various techniques for suppressing this soot to be exhausted to the atmosphere have been developed.

As one of those techniques, an exhaust emission control device of the continuous regeneration type is well-known in which an oxidation catalyst and a diesel particulate filter (DPF) are disposed in succession from the upstream side in an exhaust pipe of the diesel engine.

In this exhaust emission control device, NO in the exhaust gas is oxidized by the oxidation catalyst to produce $NO_2$ ($2NO+O_2 \rightarrow 2NO_2$), and the soot (carbon: C) captured in the DPF is oxidized by $NO_2$ produced by the oxidation catalyst ($NO_2+C \rightarrow NO+CO$, $2NO_2+C \rightarrow 2NO+CO_2$). In this exhaust emission control device, NO contained greatly in the exhaust gas is oxidized and converted into $NO_2$, which has a high function as an oxidant, and the soot is combusted at relatively low exhaust gas temperatures owing to this oxidation function of $NO_2$.

Thereby, it is possible to remove the deposited soot, and regenerate the DPF continuously, utilizing the temperature of the exhaust gas itself, without the use of other heating apparatuses such as an electric heater or a burner.

The conventional exhaust emission control device can combust and remove the soot at relatively low exhaust gas temperatures owing to catalytic action. Thus, its exhaust emission control function depends on the oxidizing ability of the oxidation catalyst. Since this oxidizing ability typically depends on the temperature of the exhaust gas surrounding the oxidation catalyst, the soot is not fully removed and the residual soot is accumulated on the DPF when the exhaust gas temperature is below a predetermined temperature that is required for the soot combustion. This occurs in a low load area of the engine.

If the soot is excessively deposited on the DPF, there is a risk that the engine output is decreased and also the DPF melts away due to abnormally high temperatures during the soot combustion. Therefore, it is required to remove the deposited soot by any means, and such methods for removing the soot include a forced regeneration method and a continuous regeneration assist method, which we reconventionally developed and adopted.

The forced regeneration method involves elevating the exhaust gas temperature up to a temperature range required for $O_2$ combustion of the soot due to post injection or the like and forcedly combusting the soot by $O_2$. However, this method is inferior in the fuel consumption because excess fuel is consumed, and must be improved for the practical use.

The continuous regeneration assist method involves assisting a continuous regeneration function by elevating the exhaust gas temperature to the maximum conversion temperature range at which the $NO_2$ conversion efficiency of oxidation catalyst is at peak by an exhaust throttle, and exhibiting the catalytic ability of oxidation catalyst to the maximum. However, with this method, since a variation in the exhaust gas temperature is gentle, it takes a long time to elevate the temperature, greatly aggravating the fuel consumption, when the exhaust gas temperature greatly falls below the maximum conversion temperature range.

SUMMARY OF THE INVENTION

An object of the present invention is to provide an exhaust emission control device that can regenerate a filter without greatly aggravating the fuel consumption.

An exhaust emission control device of the present invention has a filter disposed in an exhaust passage of an engine for capturing particulates in an exhaust gas, and a catalyst disposed in the exhaust passage on the upstream side of the filter for converting NO in the exhaust gas into $NO_2$, in which the particulates deposited on the filter are combusted by $NO_2$ converted by the catalyst, thereby controlling the exhaust emission of the engine.

In order to achieve the above object, the exhaust emission control device comprises deposited amount detecting means for detecting a deposited amount of particulates deposited on the filter, operating state detecting means for detecting an operating state of the engine, temperature sensing means for sensing the temperature of the catalyst or the exhaust gas temperature on the upstream side of the filter, regeneration assist means for controlling the exhaust gas temperature or the temperature of the catalyst to enhance the conversion efficiency of the catalyst into $NO_2$, forced regeneration means for controlling the exhaust gas temperature or the temperature of the filter to be higher than the temperature that enhances the conversion efficiency of the catalyst into $NO_2$, and control means for activating the regeneration assist means, if it is determined that a specific operating state involving incomplete combustion of particulates by the $NO_2$ is continued for a predetermined period or more as a first determination condition on the basis of the detected information by the operating state detecting means, or activating the forced regeneration means, if it is determined that the deposited amount of particulates detected by the deposited amount detecting means exceeds a predetermined value as a second determination condition, wherein the control means activates either the forced regeneration means or the regeneration assist means in accordance with the temperature sensed by the temperature sensing means, when it is determined that the first and second determination conditions are established at the same time.

In this exhaust emission control device, the control means activates either the forced regeneration means or the regeneration assist means in accordance with the temperature sensed by the temperature sensing means, when it is determined that the first determination condition for activating the regeneration assist means and the second determination condition for activating the forced regeneration means are established at the same time.

When the first and second determination conditions are established at the same time, either the regeneration assist means or the forced regeneration means is activated, so that an optimal control can be effected in accordance with an engine operating situation. Namely, an effective filter regenerating process can be made.

It is desirable that the control means activates the regeneration assist means if the temperature sensed by the temperature sensing means is higher than or equal to a predetermined temperature that is lower than the temperature to enhance the conversion efficiency of the catalyst into $NO_2$, or activates the forced regeneration means if the temperature sensed by the temperature sensing means is below the predetermined temperature, when it is determined that the first and second determination conditions are established at the same time.

Herein, when the first and second determination conditions are established at the same time, and if the temperature sensed by the temperature sensing means is higher than or equal to the predetermined temperature that is lower than the temperature to enhance the conversion efficiency of the catalyst into $NO_2$, the control means activates the regeneration assist means, because there is a small difference between the exhaust gas temperature or the temperature of the catalyst and the temperature to enhance the conversion efficiency of the catalyst into $NO_2$. Thereby, it takes a shorter time to control (elevate) the temperature, and it is possible to continuously regenerate the particulates owing to catalytic action of the catalyst, with reduced consumption energy.

Moreover, when the control means activates the forced regeneration means if the temperature sensed by the temperature sensing means is higher than or equal to the predetermined temperature that is lower than the temperature to enhance the conversion efficiency of the catalyst into $NO_2$, the exhaust gas temperature is so high that the filter may melt away. However, with the invention, it is possible to prevent the filter from melting away.

Also, the control means activates the regeneration assist means if the temperature sensed by the temperature sensing means is below the predetermined temperature that is lower than the temperature to enhance the conversion efficiency of the catalyst into $NO_2$, there is a large difference between the exhaust gas temperature or the temperature of the catalyst and the temperature to enhance the conversion efficiency of the catalyst into $NO_2$, in which it takes a longer time to control (elevate) the temperature, with increased consumption energy. Hence, the exhaust gas temperature or the temperature of the filter is controlled (elevated) to the temperature for $O_2$ combusting the filter higher than the temperature to enhance the conversion efficiency of the catalyst into $NO_2$, to combust the particulates, whereby the consumption energy can be reduced as compared with the regeneration assist means.

It is desirable that the control means inhibits the activation of the regeneration assist means, if the first determination conditions is established and it is determined that the engine is in an accelerating state on the basis of the detected information by the operating state detecting means.

In this accelerating state, an excess air ratio $\lambda$ is controlled to be smaller, or in other words, the air fuel ratio is controlled to the rich side, so that the exhaust gas temperature rises to maximize or enhance a catalytic action of the catalyst. Thereby, it is expected that the combustion is promoted owing to the continuous regeneration of particulates. Therefore, it is possible to prevent the wasteful energy consumption by inhibiting the activation of the regeneration assist means in the accelerating state.

It is desirable that the control means determines that the second determination condition is established, if the deposited amount of particulates detected by the deposited amount detecting means exceeds a predetermined value, and the engine is in a specific operating state.

Namely, if the deposited amount of particulates detected by the deposited amount detecting means exceeds the predetermined value, and the engine is in the specific operating state involving incomplete combustion of particulates by $NO_2$, it is determined that the second determination condition is established, and the forced regeneration means is activated.

When the engine is in the specific operating state involving incomplete combustion of particulates by $NO_2$, the forced regeneration means is activated to control (elevate) the exhaust gas temperature or the temperature of the filter to be higher than the temperature to enhance the conversion efficiency of the catalyst into $NO_2$, whereby it is possible to avoid the forced regeneration control in the operating state where the particulates deposited on the filter can be sufficiently combusted by $NO_2$, or the continuously regenerable area in which the particulates are continuously combustible. Therefore, the activation interval is lengthened, the activation frequency is reduced, and the wasteful energy consumption is prevented.

It is desirable that the temperature sensing means is disposed on the upstream side of the filter and on the downstream side of the catalyst and senses the temperature of the exhaust gas that passed through the catalyst.

Since the temperature sensing means is disposed on the upstream side of the filter and on the downstream side of the catalyst and senses the temperature of the exhaust gas after passing through the catalyst, a difference between the exhaust gas temperature or the temperature of the catalyst and the temperature to enhance the conversion efficiency of the catalyst into $NO_2$ can be measured precisely. Therefore, it is possible to reduce the consumption energy in filter regeneration and prevent the filter from melting away.

It is desirable that the control means inhibits the activation of the regeneration assist means, if the first determination conditions are established and it is determined that the engine is in a decelerating state on the basis of the detected information by the operating state detecting means and the suction throttle or exhaust throttle is on the closed valve side.

Namely, even in the state where the first determination condition is established, the suction air amount is restricted because the suction throttle or exhaust throttle is controlled on the closed valve side in the decelerating state, whereby the exhaust gas temperature is prevented from falling, the conversion of the catalyst into NO2 is sufficiently made, and the combustion of particulates deposited on the filter by NO2 is promoted. Therefore, it is possible to prevent the wasteful energy consumption by inhibiting the control (temperature elevation activation) for the exhaust gas temperature or the temperature of the catalyst by the regeneration assist means in the decelerating state.

DETAILED DESCRIPTION OF THE PREFFERED EMBODIMENTS

Figure 1:
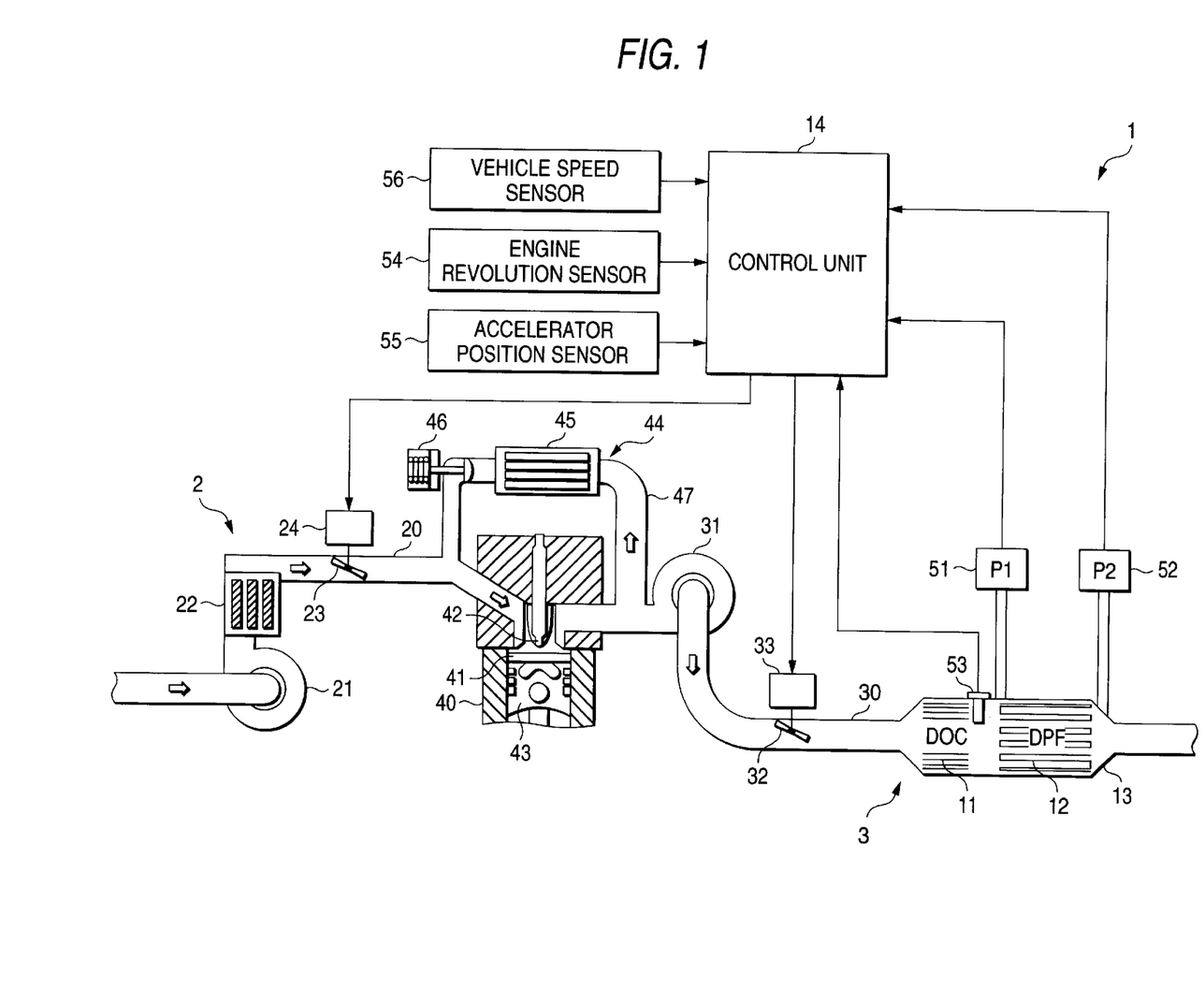
FIG. 1 is a diagram showing the overall constitution of a diesel engine according to one embodiment of the present invention.
Figure 2:
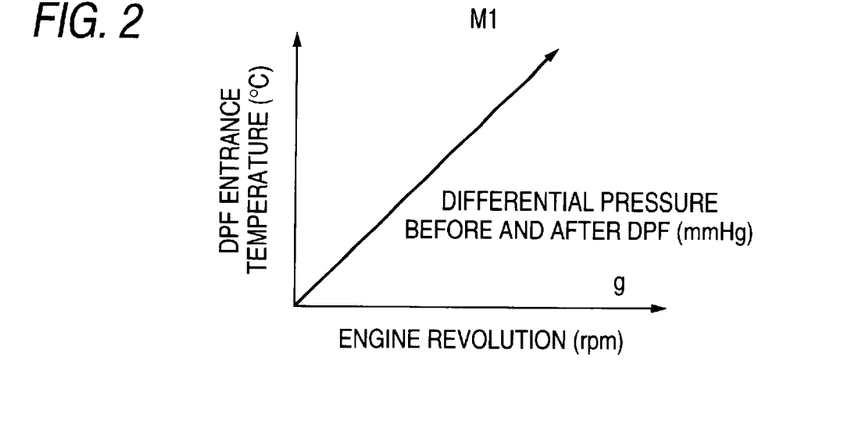
FIG. 2 is a graph for explaining the action of an exhaust emission control device for the diesel engine according to the embodiment of the invention.
Figure 3:
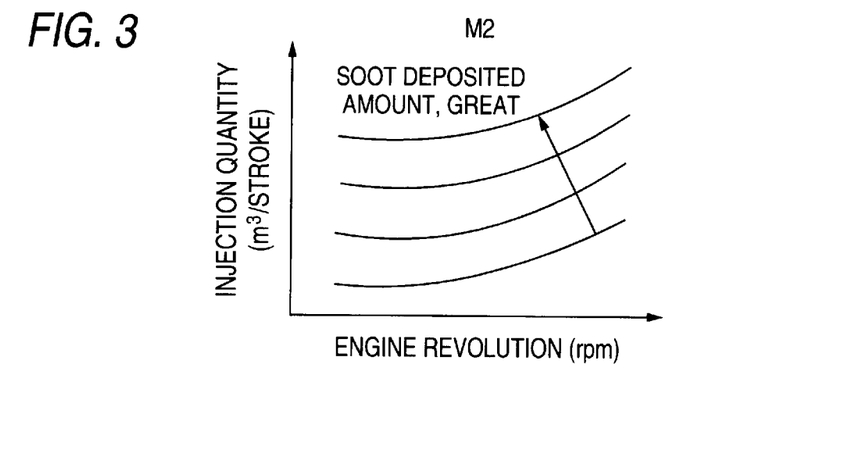
FIG. 3 is a graph for explaining the action of the exhaust emission control device for the diesel engine according to the embodiment of the invention.
Figure 4:
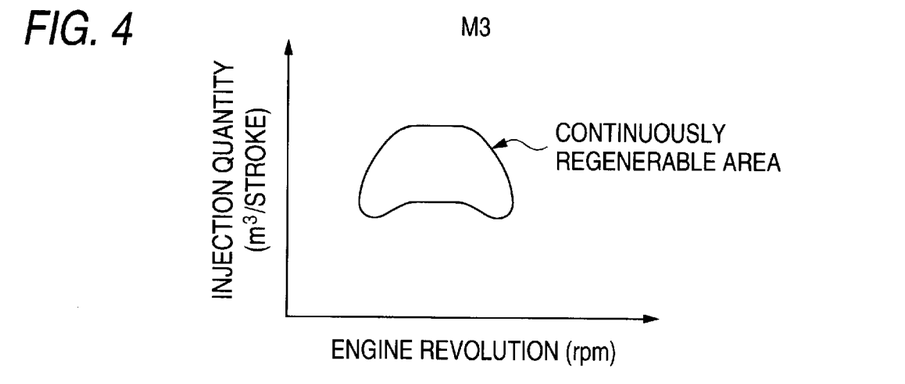
FIG. 4 is a graph for explaining the action of the exhaust emission control device for the diesel engine according to the embodiment of the invention.
Figure 5:
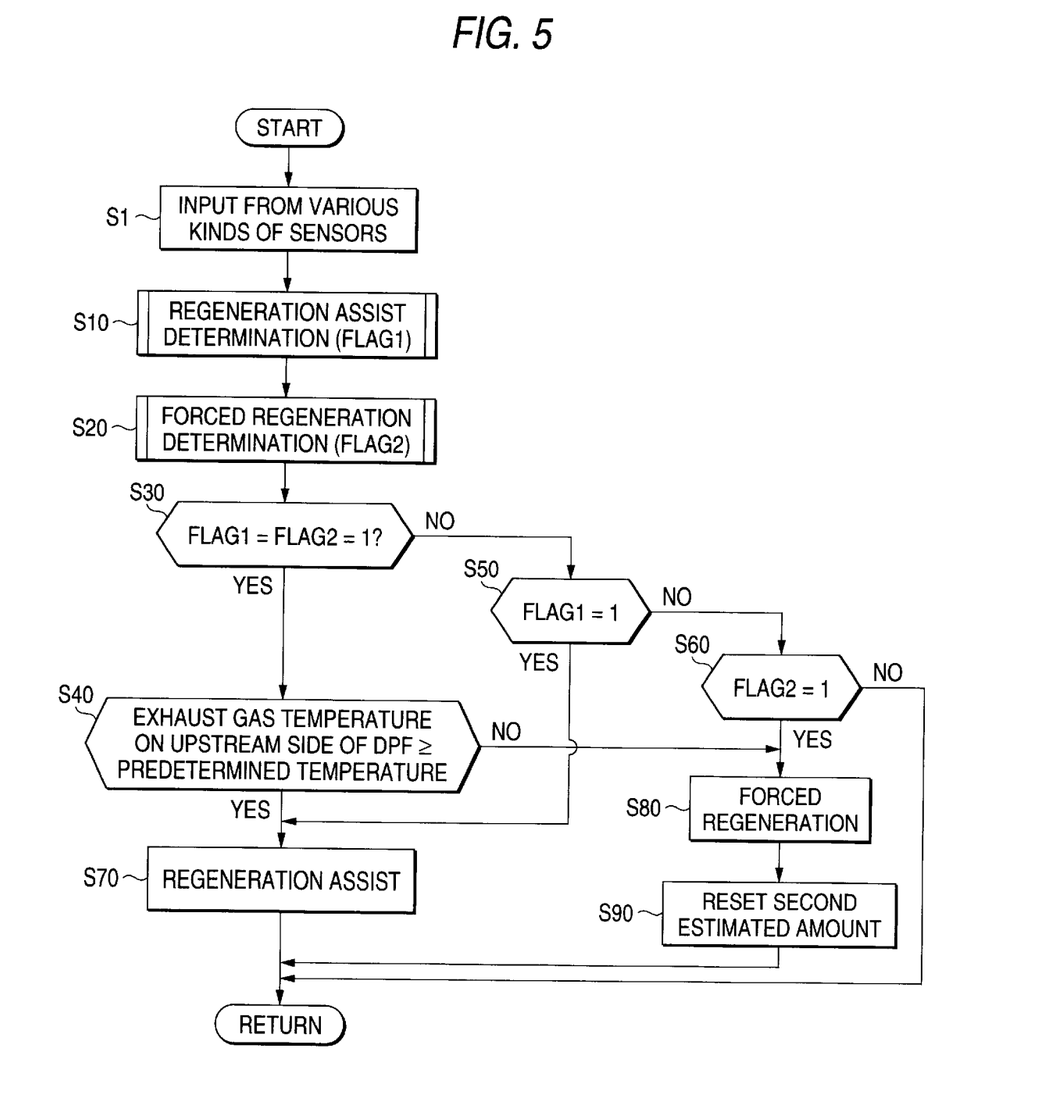
FIG. 5 is a flowchart for explaining the action of the exhaust emission control device for the diesel engine according to the embodiment of the invention.
Figure 6:
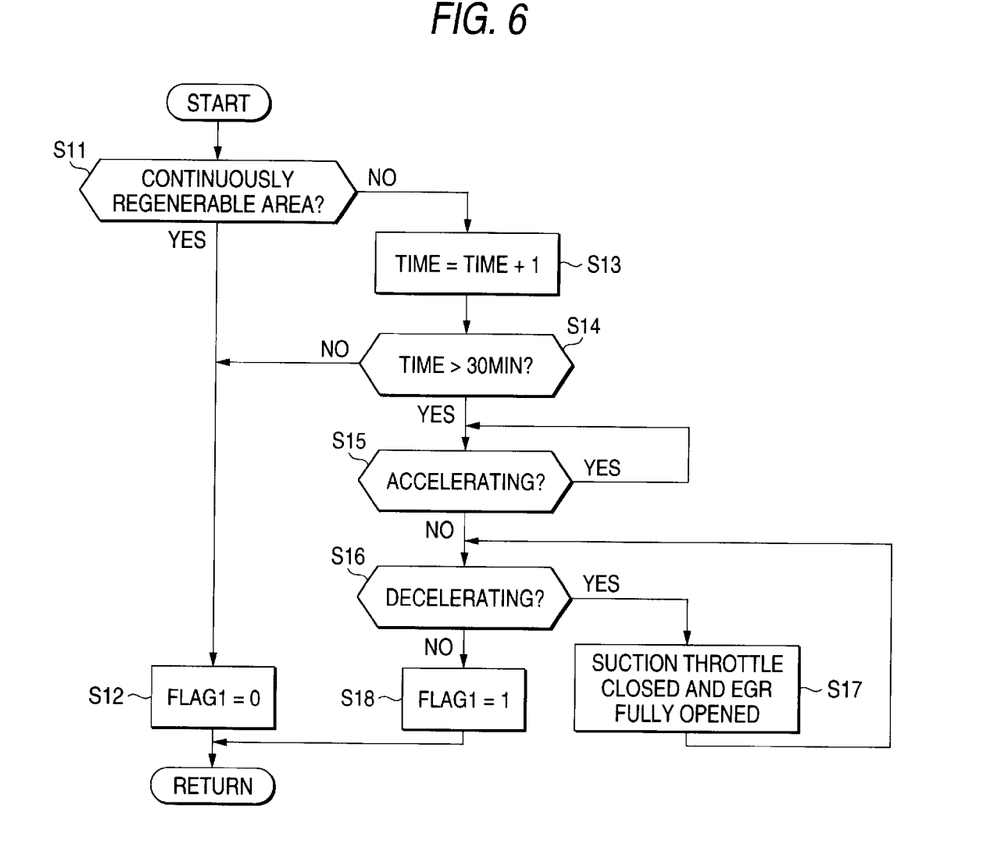
FIG. 6 is a flowchart for explaining the action of the exhaust emission control device for the diesel engine according to the embodiment of the invention.
Figure 7:
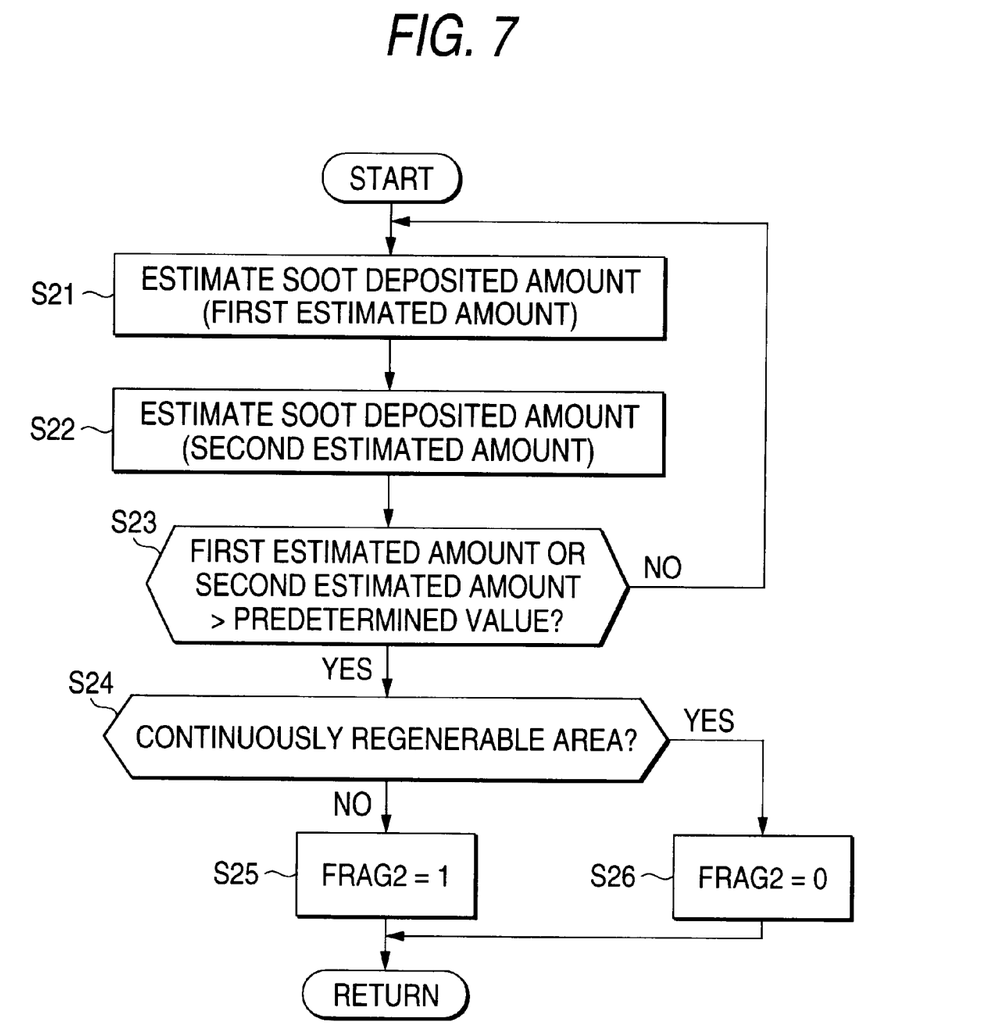
FIG. 7 is a flowchart for explaining the action of the exhaust emission control device for the diesel engine according to the embodiment of the invention.
Figure 8:
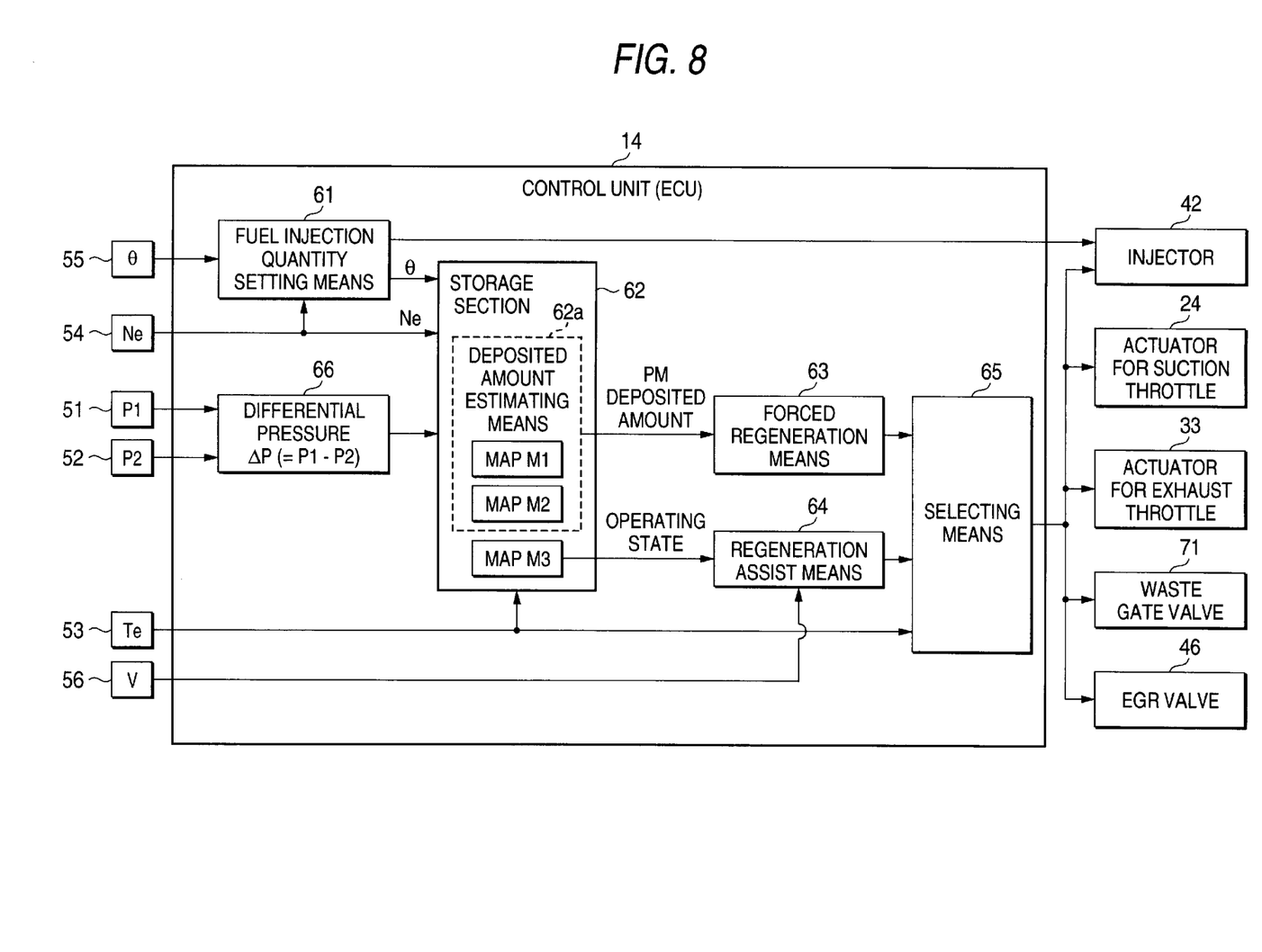
FIG. 8 is a control block diagram for explaining the functions of the exhaust emission control device for the diesel engine according to the embodiment of the invention.

An exhaust emission control device according to one embodiment of the present invention will be described below with reference to the drawings. FIG. 1 is a typical diagram showing the overall configuration of a diesel engine equipped with the exhaust emission control device. FIGS. 2 to 4 are graphs showing a control map for use with the control. Also, FIGS. 5 to 7 are flowcharts for explaining the action. Moreover, FIG. 8 is a control block diagram for explaining the functions.

A diesel engine in this embodiment comprises an engine main body 40, a suction system 2, an exhaust system 3, an Exhaust Gas Recirculation system (EGR system) 44 and a control unit (controller) 14, as shown in FIG. 1.

The suction system 2 comprises a suction pipe 20, a compressor 21, an inter-cooler 22 and a throttle (suction throttle) 23, whereby the air outside the vehicle is forcefully fed into the suction pipe 20 by the compressor 21, cooled by the inter-cooler 22 and introduced into an engine main body 40. The throttle 23 provided within the suction pipe 20 has its aperture varied by an actuator 24, so that the amount of air flowing into the engine main body 40 is increased or decreased by operation of this throttle 23 to adjust the exhaust gas temperature.

The engine main body 40 is a general internal combustion engine having a combustion chamber 41, a fuel injection valve 42 and a piston 43. A fuel injected from the fuel injection valve 42 and an inflow air are mixed within the combustion chamber 41, whereby its motive force is taken out via the piston 43 and the exhaust gas is exhausted out of the exhaust system 3.

The EGR system 44 comprises an EGR valve 46 and an EGR cooler 45, whereby the exhaust gas is partially recirculated via an EGR passage 47 to the suction system 2 to suppress $NO_2$, and enhance the fuel utilization efficiency. Namely, the exhaust gas exhausted from the combustion chamber 41 is partially taken out through the EGR passage 47, then cooled by the EGR cooler 45, and introduced into the combustion chamber 41 again. And the exhaust gas is combusted with a new fuel injected from the fuel injection valve 43 to slow down the combustion, and reduce $NO_2$ that is produced at high temperatures. If the recirculation amount of exhaust gas is too great, the temperature of the combustion chamber falls sharply to increase the amount of black smoke. The EGR valve 46 controls the recirculation amount optimally.

The exhaust system 3 comprises an exhaust pipe (exhaust passage) 30, a turbine 31, an oxidation catalyst (exhaust emission catalyst) 11, and a Diesel Particulate Filter (DPF) 12, whereby the exhaust gas drives the turbine 31 rotating integrally with the compressor 21, and delivered to the exhaust pipe 30. And the exhaust gas is introduced into a housing 13 equipped with the oxidation catalyst 11 and the DPF 12 to combust and remove the soot (particulates).

Also, an exhaust shutter (exhaust throttle) 32 is provided within the exhaust pipe 30 on the upstream side of the housing 13. Its aperture is varied by the actuator 33. Since this shutter 32 adjusts the amount of exhaust gas flowing into the housing 13, the soot combustion amount is increased or decreased so that the temperature of the housing 13 is adjusted by the combustion heat.

The housing 13 has its upstream side and downstream side connected to the exhaust pipe 30 respectively, and internally comprises the oxidation catalyst 11 (catalyst), the DPF 12, a first pressure sensor 51, a second pressure sensor 52 and a temperature sensor (temperature sensing means) 53. In FIG. 1, the temperature sensor 53 detects the exhaust gas temperature on the downstream side of the oxidation catalyst 11 and the upstream side of the DPF 12. The temperature sensor 53 may detect the temperature of the oxidation catalyst 11. The soot in the exhaust gas flowing in from the upstream side is captured by the DPF 12, and the soot captured by $NO_2$ converted from NO under catalytic action of the oxidation catalyst 11 is combusted and removed, and the harmless exhaust gas is delivered to the exhaust pipe 30 on the downstream side.

The housing 13 has an adiabatic structure to prevent the temperature of an outer peripheral face of the housing 13 from being decreased by a cold outside air around the housing 13 to prevent the cinder of the soot in the DPF 12 from occurring.

The oxidation catalyst 11 comprises a honeycomb support having oxidation catalyst components including Pt (platinum) as a main component, and disposed on the upstream side of the exhaust passage within the housing 13 to convert NO contained in the exhaust gas of the diesel engine by relatively large quantities into $NO_2$ having high oxidation function. With this oxidation function of $NO_2$, carbon (C) as a main component of the soot captured in the DPF 12 can be combusted and removed using the temperature of exhaust gas itself, even at relatively low temperatures (temperatures that are more than or equal to the lower limit temperature at which the soot can be self ignited).

This oxidation catalyst 11 is a material with which the $NO_2$ conversion efficiency (or inversion efficiency) is at maximum when the exhaust gas temperature is about 280° C. Therefore, during normal driving in which the exhaust gas temperature is from 270° C. to 350° C., the soot is combusted due to catalytic action alone without performing the forced regeneration or regeneration assist control, so that the DPF 12 is continuously regenerated.

The DPF 12 is a porous ceramic filter formed of cordierite or silicon carbide, which is disposed on the downstream side of the oxidation catalyst 11 in the exhaust passage within the housing 13 to capture the soot in the exhaust gas with the fine bores.

The first pressure sensor 51 and the second pressure sensor 52 detect the pressures before and after the DPF 12, respectively. The first pressure sensor 51 is provided between the oxidation catalyst 11 and the DPF 12, and the second pressure sensor 52 is provided on the downstream side of the DPF. The detected result P1, P2 of each sensor 51, 52 is output to the control unit 14, and a differential pressure (P1–P2) between the pressures before and after the DPF 12 is calculated by an arithmetic operation section 66 (see FIG. 8) provided in the control unit 14.

The temperature sensor 53 detects the temperature Te near an entrance of the DPF 12, and is provided between the oxidation catalyst 11 and the DPF 12 to output the detected result to the control unit 14.

The control unit 14 has an input/output device (not shown), a storage section 62 for storing a control program, and the arithmetic operation section 66, as shown in FIG. 8.

This control unit (control means) 14 is connected to the pressure sensors 51 and 52, the temperature sensor 53, an engine revolution sensor 54, an accelerator position sensor 55, a vehicle speed sensor 56, as shown in FIGS. 1 and 8. The sensed result of each sensor is input into the control unit 14. At least the engine revolution sensor 54 and the accelerator position sensor 55 make up operating state detecting means for the engine.

Moreover, the control unit 14 is provided with fuel injection quantity setting means 61 for setting the fuel injection quantity Q on the basis of the information from the engine revolution sensor 54 and the accelerator position sensor 55. The control unit 14 controls the exhaust gas flow amount within the exhaust pipe 30 or the fuel injection quantity Q injected from the fuel injection valve 42 on the basis of the sensed result of each sensor, so that the soot captured in the DPF 12 is combusted and removed efficiently.

The storage section 62 of the control unit 14 stores control maps M1 to M3, as shown in FIGS. 2 to 4, whereby it is possible to estimate the soot deposited amount of the DPF 12 from the present operating situation or the operating history up to now, or estimate whether or not the DPF 12 is now in a continuously regenerable state on the basis of the sensed information of each sensor.

A control map M1 is used to estimate the soot deposited amount (first estimated amount) E1 on the basis of the present operating situation, in which a differential pressure (P1–P2) before and after the DPF is related with the DPF entrance temperature Te and the engine speed Ne, with reference to the soot deposited amount, shown in FIG. 2. The soot deposited amount can be obtained from the engine speed Ne, the DPF entrance temperature Te and the differential pressure (P1–P2) before and after the DPF as the parameters in accordance with this control map M1.

A control map M2 is used to estimate the present soot deposited amount (second estimated amount) E2 from the operating history, in which the cumulative soot deposited amount after the end of forced regeneration at the previous time is related with the engine speed Ne and the fuel injection quantity Q, shown in FIG. 3. The soot deposited amount can be defined as an increasing function of the fuel injection quantity Q, and a decreasing function of the engine speed Ne.

Accordingly, the control map M1 and the control map M2 function as deposited amount estimating means (deposited amount detecting means) 62a for estimating or detecting the deposited amount of soot deposited on the DPF 12.

A control map M3 is used to determine whether or not the DPF 12 is in a continuously regenerable state at present on the basis of the operating situation at the time of detection, in which the continuously regenerable area is related with the operating state defined by the engine speed Ne and the fuel injection quantity Q set up on the basis of the engine speed Ne and the accelerator position (load) θ.

This continuously regenerable area refers to an operating state where the DPF 12 is continuously regenerable under the action of the oxidation catalyst 11 without performing the forced regeneration or regeneration assist control, and is limited in a specific area within a plane having the engine speed Ne and the fuel injection quantity Q as the coordinate axes. For example, in a case where the fuel injection quantity Q is increased over the above area with the engine speed Ne being constant, the amount of oxygen (air) supplied into the combustion chamber 41 is less sufficient for supplied fuel Q so that the soot is more likely to arise, whereby the production amount of soot is greater than the combustion amount of soot. On the contrary, in a case where the fuel injection quantity Q is decreased, the temperature within the combustion chamber 41 falls, so that the soot is not combusted though the production amount of soot is small, whereby the DPF is not continuously regenerable.

By the way, the control unit 14 is provided with forced regeneration means 63 for forcedly regenerating the DPF 12 and continuous regeneration assist means 64 for elevating the exhaust gas temperature to the temperature at which the DPF 12 is continuously regenerable, as shown in FIG. 8.

The forced regeneration means 63 controls the forced regeneration of the DPF 12, if the deposited amount of soot estimated or detected by the control map M1 or control map M2 exceeds a predetermined amount (e.g., 25 g). More specifically, the exhaust gas temperature is temporarily elevated in the temperature range necessary for $O_2$ combustion of the soot, and the soot is forcedly $O_2$ combusted without relying on the catalytic action. The forced regeneration control is made in combination of retarding the main injection time, activation of the EGR system 44 (recirculation of the exhaust gas), and the post injection or exhaust stroke injection.

That is, the combustion in the combustion chamber 41 is retarded by retarding the main injection time, so that the combustion gas at high temperature is exhausted to increase the exhaust gas temperature. Also, the exhaust gas at higher temperature than the new air is flowed into the combustion chamber 41 by activating the EGR system 44 to recirculate the exhaust gas, thereby increasing the exhaust gas temperature. Furthermore, if the fuel is injected into the combustion chamber 41 by post injection in an expansion stroke of the engine main body 40, the injected fuel arrives at the oxidation catalyst 11 and is oxidized.

And the exhaust gas temperature is elevated to the higher temperature range (e.g., 500° C. to 550° C.) than during the continuous regeneration under the controls, and the soot deposited on the DPF 12 is directly oxidized by $O_2$ ($O_2$ combustion). Also, the fuel not consumed by the oxidation catalyst 11 adheres to the soot on the DPF 12 to activate the combustion of the soot.

The continuous regeneration assist means 64 controls the exhaust gas temperature to be elevated to the continuously regenerable area (continuous regeneration assist control), when an operating state outside the continuously regenerable area (i.e., a specific operating state where the combustion of particulates by $NO_2$ is insufficient) is continued for a predetermined time (e.g., 30 minutes) or more during normal driving where the engine is not in acceleration or deceleration condition (hereinafter referred to as a predetermined operating state).

More specifically, the continuous regeneration assist control involves elevating the exhaust gas temperature to a conversion peak temperature range where the $NO_2$ conversion efficiency of the oxidation catalyst 11 is at maximum, including closing tight the suction throttle 23, opening a west gate valve 71, or narrowing the aperture of the exhaust shutter 32 to some extent by the control unit 14. The suction amount of new air is suppressed by narrowing the aperture of the suction throttle 23 or the exhaust shutter 32 to elevate the exhaust gas temperature.

A determination as to whether or not the engine is in acceleration or deceleration condition is made on the basis of a temporal variation of the acceleration position θ or vehicle speed V. Namely, it is determined that the engine is being accelerated, if the temporal variation of the acceleration divergence θ or vehicle speed V exceeds a predetermined positive value, or the engine is being decelerated, if it falls below a predetermined negative value or is equal to zero.

Accordingly, in this embodiment, the operating state detecting means is made up of the engine revolution sensor 54, the accelerator position sensor 55 and the vehicle speed sensor 56.

By the way, there are some cases where the condition for performing the forced regeneration control by the forced regeneration means 63 (hereinafter referred to as the forced regeneration condition) and the condition for performing the continuous regeneration assist control by the continuous regeneration assist means 64 (hereinafter referred to as the regeneration assist condition, or the operating condition where predetermined operating state is detected) are established at the same time, depending on the operating state of the engine.

That is, it is estimated or detected by the control map M1 or control map M2 that the deposited amount of soot exceeds a predetermined value, and if it is determined that the operating state of the engine is in the predetermined operating state, it follows that both the forced regeneration condition and the regeneration assist condition are established.

In order to make appropriate control in this situation, this exhaust emission control device is provided with selecting means 65 for selecting which control to perform, when both the forced regeneration condition and the regeneration assist condition are established, as shown in FIG. 8. Herein, the selecting means 65 selects any one of the controls to perform it and inhibits the other control, on the basis of the temperature Te near the entrance of the DPF 12 that is sensed by the temperature sensor 53, when both the forced regeneration condition and the regeneration assist condition are established at the same time.

More specifically, if the temperature Te sensed by the temperature sensor 53 exceeds a predetermined value (e.g., 200° C.), the continuous regeneration assist control by the continuous regeneration assist means 64 is selected and performed.

If the temperature Te is below the predetermined value, the selecting means 65 selects the forced regeneration control by the forced regeneration means 63 to perform it. Namely, if the temperature Te is below the predetermined value, it takes a long time to elevate the exhaust gas temperature owing to the continuous regeneration assist control, making the fuel consumption worse. Hence, in such instances, the forced regeneration control with high effect of temperature elevation is performed and the temperature elevation time is shortened to prevent the fuel consumption from becoming worse. Also, if the temperature Te is greater than or equal to the predetermined value, excessive temperature elevation control is suppressed to prevent the DPF 12 from melting away.

Since the exhaust emission control device according to one embodiment of the invention is constituted in the above manner, the regeneration control of the DPF 12 is made in accordance with the flowcharts of FIGS. 5 to 7.

That is, in making the DPF regeneration control, first of all, the control unit 14 inputs the sensed results from various kinds of sensors (step S1), as shown in FIG. 5. And it is determined whether or not the regeneration assist condition is satisfied (regeneration assist determination) at step S10 and whether or not the forced regeneration condition is satisfied (forced regeneration determination) step S20.

The regeneration assist determination at step S10 is made by determining whether or not the engine is in the continuously regenerable area, employing the control map M3. Namely, the control unit 14 firstly determines at step S11 whether or not the DPF is in a continuously regenerable state at present on the basis of the engine speed Ne and the fuel injection quantity Q, as shown in FIG. 6. If it is in the continuously regenerable state, the flag 1 is set to zero at step S12, and the routine goes to the step S30.

On the contrary, if it is outside the continuously regenerable area, the timer is counted at step S13. Then, the timer is monitored at step S14. If the timer does not exceed 30 minutes, the flag 1 is set to zero at step S12, and the routine goes to step S30.

If the operating state, which exceeds the exhaust emission control function with the oxidation catalyst 11, is continued for a certain time (e.g., 30 minutes) or more, the operating state is checked from the aspect of acceleration at step S15 and step S16. Namely, if it is determined that the engine is accelerating because a temporal variation of the acceleration position θ or the vehicle speed V exceeds a predetermined positive value at step S15, it is expected that the soot consumption is promoted owing to a rise in the exhaust gas temperature. Thus, the control is inhibited till the acceleration is ended. Also, if the temporal variation of the acceleration divergence θ is below a predetermined negative value or equal to zero or the temporal variation of the vehicle speed V is below a predetermined negative value at step S16, it is determined that the engine is decelerating. In this case, the throttle 23 is closed and the EGR passage 47 is completely opened at step S17, thereby suppressing the exhaust gas temperature from falling.

Instead of step S17, at least the throttle 23 may be closed to suppress the exhaust gas temperature from falling. Or in addition to step S17, an excess air ratio λ may be reduced. Also, instead of step S17, the exhaust shutter 32 may be closed and the EGR passage completely opened to suppress the exhaust gas temperature from falling.

If the temporal variation of the acceleration position θ or the vehicle speed V is within a predetermined range, it is determined that the engine is in the normal operating state, the flag 1 is set to 1 at step S18 and then the routine goes to step S20.

In the above regeneration assist determination, if the operating state, which exceeds the exhaust emission control function with the oxidation catalyst 11, is continued for a certain time (e.g., 30 minutes) or more, and the engine is neither accelerating nor decelerating, the flag 1 for regeneration assist control is set to 1 at step S18. However, additionally, if the operating state, which exceeds the exhaust emission control function with the oxidation catalyst 11, is continued for a certain time (e.g., 30 minutes) or more, the flag 1 for regeneration assist control may be directly set to 1 at step S18, whereby determining that a first determination condition as a determination condition for regeneration assist control is established.

A forced regeneration determination at step S20 is made in such a way that the forced regeneration condition is firstly determined on the basis of the soot deposited amounts E1 and E2 estimated employing the control maps M1 and M2. Then, whether or not the continuous regeneration is possible is confirmed from the operating condition at present. Namely, the control unit 14 firstly calculates the first deposited amount E1 at step S21, as shown in FIG. 7. Furthermore, the routine goes to step S21 to calculate the second deposited amount E2.

If at least one of the deposited amounts E1 and E2 exceeds a predetermined value at step S23, a determination is made whether or not the operating condition at present is in the continuously regenerable area at step S24. This is made by taking into account the possibility that even if the forced regeneration condition is established at step S23, the operating condition transfers to the continuously regenerable area due to ensuing changes in the operating condition. This determination is made using the control map M3. The predetermined value is set at 25 g, for example.

If it is determined that the operating condition is outside the continuously regenerable area at step S24, the flag 2 is set to 1 at step S25 and the routine goes to step S30.

In the above forced regeneration determination, if it is determined that at least one of the deposited amounts E1 and E2 exceeds the predetermined value at step S23, and the operating condition is outside the continuously regenerable area at step S24, the flag 2 for forced regeneration control is set to 1 at step S25. However, if it is determined that at least one of the deposited amounts E1 and E2 exceeds the predetermined value at step S23, it is supposed that a second determination condition as a determination condition for forced regeneration control is established, and the flag 2 for forced regeneration control may be directly set to 1 at step S25, whereby the second determination condition as the determination condition for forced regeneration control is established.

On the other hand, if the operating condition is within the continuously regenerable area, it is determined that there is no need for forced regeneration, in which the flag 2 is set to zero at step S26, and the routine goes to step S30.

Then, the control unit 14 selects a method for DPF regeneration control on the basis of the flags set up at steps S10 and S20.

That is, if the flags 1 and 2 are both set to 1 at step S30, and both the regeneration assist condition and the forced regeneration condition are established, it is determined whether or not the DPF entrance temperature Te is above a predetermined temperature. This predetermined temperature is set to 200° C., for example. If Te exceeds this predetermined temperature, the regeneration assist control is made at step S70. Conversely, if Te is below the predetermined temperature, the forced regeneration control is made at step S80.

If either one of the flags 1 and 2 is set to 1 at step S30, either the regeneration assist control or the forced regeneration control is selected in accordance with its determination result. That is, if the flag 1 is only set to 1 at step S50, the regeneration assist control is made at step S70. Also, if the flag 2 is only set to 1 at step S60, the forced regeneration control is made to combust and remove the soot at step S80.

When the forced regeneration control is made, it is supposed that the soot on the DPF 12 is fully combusted and removed, whereby the second deposited amount is set to zero at step S90.

When both the flags 1 and 2 are set to zero, the control is inhibited and the normal operating state is kept.

Accordingly, with the exhaust emission control device of this embodiment, the reference temperature for control branch (predetermined temperature) is preset, and which control is made is decided on the basis of the comparison between the exhaust gas temperature and the predetermined temperature when both the regeneration assist condition and the forced regeneration condition are established. Thus, it is possible to make the DPF regeneration efficiently in respect of fuel consumption.

That is, if the DPF entrance temperature Te (exhaust gas temperature) is higher than the predetermined temperature, there is a small difference between the temperature at which the $NO_2$ conversion efficiency of the oxidation catalyst 11 is at maximum (target temperature) and the current exhaust gas temperature, and it takes a short time to elevate the temperature. Therefore, the regeneration assist control, rather than the forced regeneration, is made, whereby the continuous regeneration is enabled without degrading the fuel consumption due to excess fuel injection.

On the contrary, if the forced regeneration control is made in the temperature range near the predetermined temperature, there is the risk that the exhaust gas temperature is so high as to cause the oxidation catalyst 11 or the DPF 12 to melt away. Therefore, the regeneration assist control is effectively made under such conditions.

If the DPF entrance temperature Te is lower than the predetermined temperature, there is a large difference between the target temperature and the exhaust gas temperature at present, whereby it takes a long time to elevate the temperature under the regeneration assist control, degrading the fuel consumption. Therefore, the soot is combusted by elevating the exhaust gas temperature sharply under the forced regeneration control, and the fuel consumption can be improved over the regeneration assist control, even in consideration of the post injection.

At this time, the temperature sensor 53 is disposed on the downstream side of the oxidation catalyst 11 and the upstream side of the DPF 12 to sense the exhaust gas temperature after reaction with the oxidation catalyst 11, where by the temperature near the oxidation catalyst 11 required for the control can be measured more accurately. Therefore, in the DPF regeneration control, the efficiency in respect of the fuel consumption can be further improved, and melting of the DPF 12 is surely prevented.

In making the forced regeneration determination, if at least one of the estimated deposited amounts exceeds a predetermined value (e.g., 25 g) employing the estimated deposited amounts E1 and E2 for two kinds of soot having different properties, the forced regeneration is made. Thus, the influence from a sensor failure can be suppressed to the minimum.

That is, the first estimated amount E1 is the soot deposited amount estimated on the basis of the sensed information input from various kinds of sensors when determining whether or not the forced regeneration is enabled, the operating situation at present can be reflected correctly, without being affected by the history of operating state up to the determination time. On the contrary, the second estimated amount E2 is the soot deposited amount calculated as a cumulative value in the operating history from the time when the previous operating situation is ended to the time of determining whether to make the forced regeneration at present. Thus, even if any of various kinds of sensors fails at the time of determination and its function is lost, it is possible to provide a material for determining whether to make the forced regeneration on the basis of the cumulative value obtained.

Moreover, when the possibility of the continuous regeneration is determined, and the continuous regeneration is enabled because the operating state of the engine is changed after determining the forced regeneration, the flag 2 is set to zero, and the forced regeneration control is inhibited. Thus, the forced regeneration interval can be lengthened. Thereby, the frequency of the forced regeneration is reduced, so that the load of the DPF 12 is relieved, and the wasteful fuel consumption for the forced regeneration is prevented.

This invention is not limited to the above embodiments, and various variations may be made without departing from the scope or spirit of the invention.

For example, the regeneration assist control is not limited to the methods for elevating (controlling) the exhaust gas temperature as in the above embodiments. The regeneration assist control may be made by activating the oxidation catalyst 11 by the electric heater or gas burner, and elevating the temperature of the oxidation catalyst 11 in the temperature range for enhancing the $NO_2$ conversion efficiency. Also, the forced regeneration control method may rely on any means such as the electric heater or gas burner, as far as it can elevate the exhaust gas temperature to the temperature required for $O_2$ combustion of the soot.

In the above embodiments, the temperature sensing means uses the temperature sensor 53 to sense the exhaust gas temperature on the downstream side of the oxidation catalyst 11 and the upstream side of the DPF 12, or sense the temperature of the oxidation catalyst 11. The methods for sensing the temperature of the oxidation catalyst are not limited to those of the above embodiments. Using the same parameters (engine speed Ne, fuel injection quantity Q) as in FIG. 4, a relation between the operating state defined by those parameters and the exhaust gas temperature or the temperature of the oxidation catalyst 11 may be mapped in advance. From this relation, the exhaust gas temperature or the temperature of the oxidation catalyst may be estimated.

Moreover, in the above embodiments, at step S18 for regeneration assist determination, if it is determined on the basis of the operating state that the first determination condition is established because the specific operating state where the combustion of particulates with $NO_2$ is insufficient is continued for a predetermined period or more, the flag 1 is set to 1, and at step S25 for the forced regeneration determination, if it is determined that the first determination condition is established because the deposited amount of particulates exceeds a predetermined amount, the flag 2 is set to 1, whereby if any one of the flags 1 and 2 is only set at 1, either the regeneration assist control or the forced regeneration control is selected by the selecting means 65 (steps S30, S50, and S60) in accordance with the set flag, and operated. However, other variations may be made.

Namely, the forced regeneration means 63 and the regeneration assist means 64 may respectively have functions of the forced regeneration determination and the regeneration assist determination. If the determination condition is established, the forced regeneration control and the regeneration assist control may be activated independently, and if the flags 1 and 2 are both set at 1, that is, it is determined that the first and second determination conditions are established at the same time, any one of them may be selected by the selection means 65 in accordance with the temperature condition of the exhaust gas, and the other inhibited.

What is claimed is:

1. An exhaust emission control device having a filter disposed in an exhaust passage of an engine for capturing particulates in an exhaust gas, and a catalyst disposed in the exhaust passage on the upstream side of the filter for converting NO in the exhaust gas into $NO_2$, in which the particulates deposited on the filter are combusted by $NO_2$ converted by the catalyst, the exhaust emission control device comprising:

deposited amount detecting means for detecting a deposited amount of particulates deposited on the filter;

operating state detecting means for detecting an operating state of the engine;

temperature sensing means for sensing the temperature of the catalyst or the exhaust gas temperature on the upstream side of the filter;

regeneration assist means for controlling the exhaust gas temperature or the temperature of the catalyst so as to enhance the conversion efficiency of the catalyst into $NO_2$;

forced regeneration means for controlling the exhaust gas temperature or the temperature of the filter to be higher than the temperature that enhances the conversion efficiency of the catalyst into $NO_2$; and control means for activating the regeneration assist means if it is determined that a specific operating state involving incomplete combustion of particulates by the $NO_2$ is continued for a predetermined period or more as a first determination condition on the basis of the detected information by the operating state detecting means, or activating the forced regeneration means if it is determined that the deposited amount of particulates detected by the deposited amount detecting means exceeds a predetermined value as a second determination condition;

wherein the control means activates either the forced regeneration means or the regeneration assist means in accordance with the temperature sensed by the temperature sensing means when it is determined that the first and second determination conditions are established at the same time.

2. The exhaust emission control device according to claim 1, wherein when it is determined that the first and second determination conditions are established at the same time, the control means activates the regeneration assist means if the temperature sensed by the temperature sensing means is higher than or equal to a predetermined temperature that is lower than the temperature that enhances the conversion efficiency of the catalyst into $NO_2$ or activates the forced regeneration means if the temperature sensed by the temperature sensing means is below the predetermined temperature.

3. The exhaust emission control device according to claim 1, wherein the control means inhibits the activation of the regeneration assist means, if the first determination condition is established and it is determined that the engine is in an accelerating state on the basis of the detected information by the operating state detecting means.

4. The exhaust emission control device according to claim 1, wherein the control means determines that the second determination condition is established, if the deposited amount of particulates detected by the deposited amount detecting means exceeds a predetermined value and it is determined that the engine is in the specific operating state on the basis of the detected information by the operating state detecting means.

5. The exhaust emission control device according to claim 1, wherein the temperature sensing means is disposed on the upstream side of the filter and on the downstream side of the catalyst and senses the temperature of the exhaust gas that passed through the catalyst.

6. The exhaust emission control device according to claim 1, wherein the control means inhibits the activation of the regeneration assist means, if the first determination condition is established and it is determined that the engine is in a decelerating state on the basis of the detected information by the operating state detecting means and a suction throttle or an exhaust throttle is controlled on a closed valve side.

7. An exhaust emission control device having a filter disposed in an exhaust passage of an engine for capturing particulates in an exhaust gas, and a catalyst disposed in the exhaust passage on the upstream side of the filter for converting NO in the exhaust gas into $NO_2$, in which the particulates deposited on the filter are combusted by $NO_2$ converted by the catalyst, the exhaust emission control device comprising:

deposited amount detecting means for detecting a deposited amount of particulates deposited on the filter;

operating state detecting means for detecting an operating state of the engine;

temperature sensing means for sensing the temperature of the catalyst or the exhaust gas temperature on the upstream side of the filter;

regeneration assist means for controlling the exhaust gas temperature or the temperature of the catalyst to enhance the conversion efficiency of the catalyst into $NO_2$, if it is determined that a specific operating state involving incomplete combustion of particulates by the $NO_2$ is continued for a predetermined period or more as a first determination condition on the basis of the detected information by the operating state detecting means;

forced regeneration means for controlling the exhaust gas temperature or the temperature of the filter to be higher than the temperature that enhances the conversion efficiency of the catalyst into $NO_2$, if it is determined that the deposited amount of particulates detected by the deposited amount detecting means exceeds a predetermined value as a second determination condition; and control means for activating the regeneration assist means if the temperature sensed by the temperature sensing means is higher than or equal to a predetermined temperature that is lower than the temperature that enhances the conversion efficiency of the catalyst into $NO_2$ or activating the forced regeneration means if the temperature sensed by the temperature sensing means is below the predetermined temperature, when it is determined that the first and second determination conditions are established at the same time.

* * * * *